United States Patent Office 2,999,586
Patented Sept. 12, 1961

2,999,586
FRACTIONATION OF ALUMINA HYDRATES
Carl D. Keith, Munster, Ind., assignor, by mesne assignments, to Engelhard Industries, Inc., Newark, N.J., a corporation of Delaware
No Drawing. Filed Aug. 3, 1955, Ser. No. 526,332
5 Claims. (Cl. 209—5)

This invention relates to the fractionation of alumina hydrates according to composition and particle size by deflocculation and separating through settling.

It has been foound that platinum-alumina petroleum reforming catalysts of exceptional activity, selectivity and aging stability can be prepared from an alumina hydrate precursor composition predominating in trihydrate. In one method of manufacturing these catalysts the trihydrate composition is impregnated with a platinum compound, dried and calcined to convert the alumina hydrate precursor to the final catalyst. The precursor phase contains one or more trihydrate forms corresponding to the well-known (see Weiser Inorganic Colloid Chemistry, 1935, vol. 2, pages 90 and 92), gibbsite $$(\gamma-Al_2O_3 \cdot 3H_2O)$$

and bayerite ($\alpha-Al_2O_3 \cdot 3H_2O$), and a third trihydrate form which is presumably intermediate in structure between bayerite and gibbsite and which gives a line at 4.79 angstrom units by X-ray diffraction methods. The precursor phase may also contain a minor amount, say about 5 to about 35 weight percent, of an amorphous form of hydrated alumina or a form corresponding after drying to monohydrate, e.g. boehmite, or mixtures of these forms.

In these catalysts, it is advantageous that the precursor alumina compositions be constituted of minute crystallites, e.g. less than 1000 angstrom units, as evaluated by X-ray diffraction techniques on samples dried at approximately 110° C. I have found that platinum is preferentially deposited on the smaller alumina particles in a mixture with larger particles, and thus it is desired to obtain more uniform particle sizes in the small particle range to obtain more even platinum distribution on the alumina. The smaller hydrate particles can also be advantageous when preparing other types of catalysts; for instance, these particles provide more surface area for absorption which can be particularly valuable when depositing chromium, molybdenum, and cobalt and molybdenum, which may represent as much as about 25 to 30 weight percent of the total catalyst composition.

In one method of preparing the platinum-alumina catalysts, an aqueous solution of a soluble aluminum salt, for instance aluminum chloride, is mixed with ammonium hydroxide to precipitate a hydrate composition which is converted to the desired catalyst precursor predominating in trihydrate through aging. This method of preparation is quite satisfactory and can be used in producing catalysts having excellent characteristics; however, it does entail considerable expense particularly in that relatively pure reactants are usually employed to avoid contaminating sources such as iron. In the preparation of catalyst compositions, the use of commercially available trihydrates have been considered. Such are available as trihydrates derived from Bayer process or as a by-product in the manufacture of cracking catalysts and ammonium sulfate. As these materials are frequently by-products or are produced by relatively inexpensive procedures, their use in the catalyst preparation would materially reduce manufacturing costs. However, these commercially available trihydrate materials do not afford the most advantageous catalysts since they generally contain too great an amount of particles in the larger less advantageous size ranges.

In the present invention, I have found that alumina compositions containing trihydrate can be fractionated to separate a portion having a substantially lesser amount of larger particles which portion can be advantageously employed in catalyst preparations. In my process, the trihydrate composition usually including monohydrate form or amorphous form and containing minute particles of varying sizes, e.g., the sizes may be as large as about 50 or 75 microns, is slurried in water with the slurry then being brought to an acid pH, i.e., less than 7. This procedure effects deflocculation of the alumina hydrate particles in the aqueous medium, that is, each particle tends to act individually and larger and smaller particles do not cluster together. After the mixture is deflocculated, it can be left quiescent so that a lower layer containing the larger particles is formed by sedimentation. Preferably, in this sedimentation procedure, the slurry contains less than about 10 percent solids.

Deflocculation through acidification and settling are essential aspects of the present invention. If the original trihydrate-containing slurry were settled very little, if any, particle size fractionation could be effected. For instance, if the original slurry be settled the entire solids tend to form a single bottom layer through hydrate flocculation and coagulation and any portion of the alumina hydrate suspended through agitation has essentially the same composition and particle size distribution as the original alumina. On the other hand, by acidifying the slurry, the particles will be deflocculated and the larger ones will settle rapidly from suspension. As the smaller particle portion is colloidally suspended in the acidified aqueous medium, any convenient means can be employed to separate the suspended and settled materials.

Initially after acidification, all particles are deflocculated and behave individually and all crystals except the fairly large, i.e., greater than about 75 microns, become suspended. As the particles settle from the suspension a sample from a given height will contain a fairly close range of sizes. Of course, if permitted to stand for great lengths of time, say six months, most of the particles except the smallest will settle. Even in this case, the suspension could be reformed by stirring the mixture. Thus, my process contemplates deflocculating by acidification of a mixture of random sizes including trihydrate crystals and, if desired, one or both of the monohydrate and amorphous forms, and obtaining a fraction containing a substantially greater proportion of smaller particles than in the original hydrate sample. This procedure naturally separates a fraction containing a substantially greater proportion of larger particles than the original hydrate sample, and my process can be employed for purposes of obtaining either the smaller or the larger particle fractions or both. Surprisingly, my method separates according to composition as well as particle size with larger trihydrate particles predominating in one phase and the proportion of monohydrate or amorphous forms being increased in the smaller particle phase.

Advantageously, when desiring to employ the particles as a precursor base for a platinum metal reforming catalyst, I separate from the suspension a fraction containing large amounts of particles of less than about 1000 angstrom units. This separation can be effected by selection of particles from the proper height of the suspension and by control of settling time. Preferably, the separated fraction should contain predominant amounts of particles of approximately 100 to 1000 angstrom units. Also, as the monohydrate and amorphous forms are usually small, say less than 100 angstrom units, this method offers a means of concentrating trihydrate in mixtures with these forms even when the concentrate desired predominates in particles of less than about 1000 angstrom units.

In this invention, any convenient acidic material can be used to bring the trihydrate slurry to the acid side and the most convenient materials are the mineral acids. Of the mineral acids, I prefer nitric acid as it will not deposit undesirable ions such as sulfate and chloride derived respectively from sulfuric and hydrochloric acids, which ions in some cases must be washed from the hydrate or resulting catalyst composition. Other organic and inorganic agents which are conveniently used include carbon dioxide and lower fatty acids, for instance, acetic acid. Many of these acids, e.g., $CO_2$, nitric acid and formic acid are advantageously used in separating crystals for catalyst bases as the extraneous materials introduced are removed during calcination of the base, thus avoiding excessive washing procedures. During acidification, the pH becomes less than 7, and I prefer a pH within the range of about 4.0 to about 6.5 and in most cases, pH's of less than 4.0 are avoided as they can give rise to excessive alumina losses.

To illustrate the method of the present invention, a Filtrol trihydrate composition (R-3221) containing substantial amounts of random particle sizes was treated as follows: 18.4 kg. were added to 20 liters of deionized water and slurried. The pH of the slurry was 10.0. 900 ml. of a solution containing one part nitric acid (69–71% $HNO_3$) and 3 parts water were added to the slurry to bring the pH to 9.0. The slurry was filtered and the resulting cake was washed in a filter press with deionized water. 12.25 kg. of the filter cake (38.95 weight percent $Al_2O_3$) were slurried in 35.4 liters of deionized water. The slurry was screened and particles not passing 200 mesh (1.2 kg.) were discarded. A portion of the slurry was dried at 120° C. and the solids analyzed by X-ray diffraction techniques as follows:

|  | Weight percent |
|---|---|
| Amorphous | 3 |
| Bayerite | 43 |
| Randomite | 27 |
| Gibbsite | 27 |

Generally, bayerite crystals are substantially larger than those of randomite and gibbsite.

14.25 kg. of the screened slurry which contained 8.4 weight percent of solids was mixed with 4.75 liters of deionized water in an 8-gallon stoneware jar and stirred vigorously for about 30 minutes. The slurry had a viscosity of 8.5 Zahn seconds and a pH of 7.25. While continuing to stir, the pH was adjusted to 6.0 by addition of 15 ml. of a solution containing 1 part nitric acid (69–71% $HNO_3$) and 4 parts of water. Stirring was continued for 30 minutes and the resulting slurry had a viscosity of 8.5 Zahn seconds. The slurry was transferred to a 5-gallon bottle and was allowed to sit quiescently for 12 days after which time 1¼ inches of cake had settled to the bottom of the container.

The height of the slurry in the bottle was 13 inches and samples were taken from the slurry at the following levels:

| Sample: | Quantity ml. |
|---|---|
| 1¾″ from top of slurry | 100 |
| 6½″ from top of slurry | 100 |
| 1¾″ from bottom of container | 60 |
| Bottom cake | 40 |

These samples were dried at 110° C. and analyzed by X-ray diffraction as follows:

| Sample | Wt. Percent Amorphous | Wt. Percent Bayerite | Wt. Percent Randomite | Wt. Percent Gibbsite |
|---|---|---|---|---|
| 1¾″ from top | 13 | 9 | 37 | 41 |
| 6½″ from top | 12 | 10 | 33 | 45 |
| 1¾″ from bottom | 9 | 10 | 35 | 46 |
| Bottom cake |  | 54 | 21 | 25 |

The supernatant liquor comprising 35 lbs. was drawn from the container and comprised 35 lbs. of slurry containing 2.07 weight percent of suspended solids (330 g. $Al_2O_3$). This left the bottom cake of about 2,855 g. containing about ½ liter of the supernatant liquor. 28.5 weight percent of the alumina originally in the acidified slurry was contained in the separated supernatant liquor. A portion of the supernatant liquor was dried at 120° C. to obtain solid samples and these samples along with a sample of the bottom cake similarly dried were analyzed by X-ray diffraction as follows:

| Sample | Wt. Percent Amorphous | Wt. Percent Bayerite | Wt. Percent Randomite | Wt. Percent Gibbsite |
|---|---|---|---|---|
| Solids from supernatant liquor | 10 | 10 | 36 | 44 |
| Bottom cake |  | 51 | 26 | 23 |

These solid samples were inspected under electron microscope and at various magnifications. It was seen that the solids from the supernatant liquor were of smaller size predominantly distributed in the up to 1000 angstrom unit range, particularly in the 100 to 1000 angstrom unit range. The sample from the bottom cake, although containing some small particles of less than 1000 angstrom units, was composed of considerable portions of solids in the 2000–10,000 angstrom unit range. Thus, the effectiveness of my method affords a means for segregating alumina trihydrate, monohydrate and amorphous forms according to particle size and composition. Further, this process permits the concentration of bayerite or gibbsite and randomite in the hydrate phase due to their crystal size differences.

The distribution of platinum on the various particle sizes through impregnation was illustrated by forming an aqueous slurry (about 7.6 percent solids) of Filtrol alumina with chloroplatinic acid. An aqueous solution of hydrogen sulfide was added to precipitate the platinum on the alumina. The pH of the resulting slurry was 6.1 and the slurry was allowed to stand for eight days. Samples of the settled mixture were taken and the dried solids analyzed as follows:

| Sample | Wt. Percent Pt ($Al_2O_3$ basis) | X-Ray Diffraction Data Wt. Percent | | | | |
|---|---|---|---|---|---|---|
|  |  | Amor. | Boeh. | Bay. | Rand. | Gibb. |
| Top of slurry | 1.17 | 34 | 26 | 6 | 34 | 34 |
| Middle of slurry | 0.89 | 21 | 23 | 11 | 25 | 20 |
| Bottom of slurry | 0.29 | 1 | 8 | 55 | 14 | 22 |

Thus, in the manufacture of platinum catalysts from alumina base materials, it is desirable to employ alumina particle sizes of fairly close distribution to afford products of greater uniformity as to physical properties and catalytic performance.

I claim:
1. The method of fractionating minute solid particles of alumina hydrates containing trihydrate which comprises mixing an alumina trihydrate composition of random particle sizes with water, acidifying the mixture to obtain an acidic aqueous slurry of said alumina hydrate solid particles in the acidified aqueous medium, settling the mixture, and separating a fraction containing crystalline particles of different size distribution than in the alumina trihydrate composition acidified.
2. The method of claim 1 in which the pH upon acidification is about 4.0 to about 6.5.
3. The method of claim 2 in which nitric acid is employed in the acidification step.
4. The method of claim 2 in which the separated fraction contains a predominant amount of crystals in the approximate range of 100 to 1000 angstrom units.

5. The method of claim 4 wherein platinum is added to the separated fraction.

References Cited in the file of this patent

UNITED STATES PATENTS

| | | |
|---|---|---|
| 843,426 | Acheson | Feb. 5, 1907 |
| 1,774,510 | Grossman | Sept. 2, 1930 |
| 1,798,261 | Horsfield | Mar. 31, 1931 |
| 1,953,201 | Tosterud | Apr. 3, 1934 |
| 2,411,807 | Riesmeyer | Nov. 26, 1946 |
| 2,549,549 | Wall | Apr. 17, 1951 |
| 2,638,454 | Rowan | May 12, 1953 |
| 2,657,115 | Ashley | Oct. 27, 1953 |
| 2,768,125 | Ashley et al. | Oct. 23, 1956 |

OTHER REFERENCES

Taggart: Handbook of Mineral Dressing, Wiley and Sons, New York, New York, 1946, page 15-08, Table 1.